US012597732B2

(12) United States Patent
Zhang

(10) Patent No.: US 12,597,732 B2
(45) Date of Patent: Apr. 7, 2026

(54) QUICK-CONNECTION WATERPROOF AND DUSTPROOF JOINT AND A QUICK-CONNECTION WATERPROOF AND DUSTPROOF CONNECTING STRUCTURE

(71) Applicant: DONGGUAN ZHONGGONG TONGMING OPTOELECTRONICS TECHNOLOGY CO., LTD., Dongguan (CN)

(72) Inventor: Fangzheng Zhang, Dongguan (CN)

(73) Assignee: DONGGUAN ZHONGGONG TONGMING OPTOELECTRONICS TECHNOLOGY CO., LTD., Dongguan (CN)

( * ) Notice: Subject to any disclaimer, the term of this patent is extended or adjusted under 35 U.S.C. 154(b) by 399 days.

(21) Appl. No.: 18/026,594

(22) PCT Filed: Sep. 2, 2021

(86) PCT No.: PCT/CN2021/116169
§ 371 (c)(1),
(2) Date: Mar. 16, 2023

(87) PCT Pub. No.: WO2022/057632
PCT Pub. Date: Mar. 24, 2022

(65) Prior Publication Data

US 2023/0335940 A1 Oct. 19, 2023

(30) Foreign Application Priority Data

Sep. 16, 2020 (CN) ......................... 202010974592.2

(51) Int. Cl.
*H01R 13/52* (2006.01)
*H01R 13/73* (2006.01)

(52) U.S. Cl.
CPC ......... *H01R 13/5202* (2013.01); *H01R 13/73* (2013.01)

(58) Field of Classification Search
CPC ...................................................... H01R 13/74
(Continued)

(56) References Cited

U.S. PATENT DOCUMENTS 1,010,592 A * 12/1911 Cole ........................ F16B 9/056 403/247
4,016,359 A * 4/1977 Gamble ............... H01B 17/305 248/27.3

(Continued)

FOREIGN PATENT DOCUMENTS

CN 103134031 A 6/2013
CN 112086808 12/2020

(Continued)

OTHER PUBLICATIONS

ISR of PCT/CN2021/116169.

*Primary Examiner* — Phuong K Dinh
(74) *Attorney, Agent, or Firm* — Hemisphere Law, PLLC

(57) ABSTRACT

A quick-connection waterproof and dustproof joint and a quick-connection waterproof and dustproof connection structure, comprising a housing (9) and a quick-connection waterproof and dustproof joint. The housing (9) is provided with a through hole (91); the quick-connection waterproof and dustproof joint comprises a rod part (1); one end of the rod part (1) is provided with a gradient part (2), a contraction part (3) and a limit part (4); and the quick-connection waterproof and dustproof joint further comprises an elastic part (5) that is movably sleeved on the rod part (1). By providing the rod part (1), the gradient part (2), the contraction part (3), and the limit part (4), the connection between the quick-connection waterproof and dustproof joint and the (Continued)

housing (9) of an electric device does not need to be slotted on a side surface, and the waterproof and dustproof effects are good.

8 Claims, 6 Drawing Sheets

(58) Field of Classification Search
USPC ................................. 439/544, 540, 550, 560
See application file for complete search history.

(56) References Cited

U.S. PATENT DOCUMENTS

| | | | | |
|---|---|---|---|---|
| 5,170,017 | A | 12/1992 | Stanevich et al. | |
| 6,305,975 | B1 * | 10/2001 | Steiner .............. | H01R 13/5202 174/18 |
| 6,450,833 | B1 * | 9/2002 | Brown, Jr. ............... | B60D 1/64 439/518 |

FOREIGN PATENT DOCUMENTS

| | | | |
|---|---|---|---|
| CN | 212257843 | | 12/2020 |
| JP | 2001110513 | A | 4/2001 |
| JP | 2002270281 | A | 9/2002 |
| JP | 2012225377 | A | 11/2012 |

* cited by examiner

QUICK-CONNECTION WATERPROOF AND DUSTPROOF JOINT AND A QUICK-CONNECTION WATERPROOF AND DUSTPROOF CONNECTING STRUCTURE

TECHNICAL FIELD

The application relates to the technical field of joints, in particular to a quick-connection waterproof and dustproof joint and a quick-connection waterproof and dustproof connection structure.

BACKGROUND

With the construction requirements and the influence of the terrain environment, more and more electrical devices need to work in a humid environment, which requires the power supply products to have waterproof characteristics, and When the electrical components need to connect the internal circuit to the external power supply or components, it is necessary to use the connection connector.

There are two ways to connect the traditional connection joint to the housing of the electrical device; one way is to set a slot connected to the through hole on the side of the housing after the through hole is provided in the housing of the electrical device. The advantages of this method are: The connector can enter the through hole from the slot on the side of the housing, which is convenient for installation. The disadvantage is that the slot may lead to a poor waterproof and dustproof effect; the other way is to use the threaded fastening to install, and it is necessary to set nuts, bolts, and other components on the through hole, the advantage is that the waterproof and dustproof effect is good, and the disadvantage is that the manufacturing is complicated, and it is very troublesome to install in a small space, which requires a lot of labor and time and is not convenient for automation.

SUMMARY

The purpose of the application is achieved through the following technical solutions: a quick-connection waterproof and dustproof joint, including a rod part; one end of the rod part is provided with a gradient part; the end of the gradient part is away from the rod part is provided with a contraction part; the end of the constriction part away from the gradient part is provided with a limit part; the quick-connection waterproof and dustproof joint also includes an elastic part movably sleeved on the rod part; after the rod part, the gradient part and the contraction part pass through the housing and then set outside the contraction part.

the application further provides that, the rod part is cylindrical; the gradient part is a truncated cone; the constriction part is cylindrical;

The top surface of the gradient part is connected with the rod part; the bottom surface of the gradient part is connected with the constriction part; the radius of the bottom surface of the gradient part is greater than the radius of the top surface of the gradient part; the radius of the constriction part is greater than that of the rod part; the radius of the constricted part is smaller than the radius of the bottom surface of the gradient part.

the application further provides that the radius of the rod part is the same as the radius of the top surface of the gradient part.

the application further provides that the limit part is cylindrical; the radius of the limit part is greater than the radius of the bottom surface of the gradient part.

According to the application, a limit part is provided at the connection between the limit block and the constriction part; the radius of the limit block is the same as the radius of the bottom surface of the gradient part.

According to the application, a connector is provided at one end of the rod part away from the gradient part; a hollow passage is provided between the rod part, the gradient part, the constriction part, and the limit part; a wire is arranged in the passage; One end of the wire is connected with the connector; the other end of the wire protrudes out of the limit part.

the application further provides that the elastic part is a silicone ring or a rubber ring.

the application further provides that the thickness of the elastic part is smaller than the height of the constriction part.

A quick-connection waterproof and dustproof connection structure comprises a housing and a quick-connection waterproof and dustproof joint; the housing is provided with a through hole; the quick-connection waterproof and dustproof joint comprises a rod part; one end of the rod part is provided with the gradient part; the end of the gradient part away from the rod part is provided with a constriction part; the end of the constriction part away from the gradient part is provided with a limit part;

The rod part, the gradient part, and the constriction part are movably penetrated through the through hole; after the rod part, the gradient part, and the constriction part pass through the housing, the elastic part sleeved on the rod part passes through the gradient part and then is sleeved on the constriction part outside; the elastic part cooperates with the limit part to fix the housing and the quick-connection waterproof and dustproof joint.

According to the application, the rod part is cylindrical; the gradient part is a truncated cone; the constriction part is cylindrical; the cross-sectional shape of the through hole is a circle; and the limit part is cylindrical;

The top surface of the gradient part is connected with the rod part; the bottom surface of the gradient part is connected with the constriction part; the radius of the bottom surface of the gradient part is greater than the radius of the top surface of the gradient part; the radius of the constriction part is greater than that of the rod part; the radius of the constriction part is smaller than the radius of the bottom surface of the gradient part;

the radius of the rod part is the same as the radius of the top surface of the gradient part;

The radius of the limit part is greater than the radius of the bottom surface of the gradient part;

The radius of the through hole is greater than the radius of the bottom surface of the gradient part; the radius of the through hole is smaller than the radius of the limit part.

Beneficial effects of the application: the application provides a rod part, a gradient part, a constriction part, and a limit part so that the connection between the quick-connection waterproof and dustproof joint and the housing of the electrical device does not require side grooves, and the waterproof and dustproof effect is good, and do not need to set nuts and bolts, the installation is fist and convenient; thus facilitating automatic installation.

Among them: 1. rod part; 2. gradient part; 3. constriction part; 4. limit part; 5. elastic part; 6. limit block; 7. connector; 8. wire; 9. housing; 91. through hole.

BRIEF DESCRIPTION OF THE DRAWINGS

As can be seen from FIGS. 1 to 6, the quick-connection waterproof and dustproof joint according to the present embodiment comprises a rod part; one end of the rod part is provided with a gradient part; one end of the gradient part away from the rod part is provided with a contraction part; one end of the contraction part away from the gradient part is provided with a limit part; the quick-connection waterproof and dustproof connector further comprises an elastic part movably sleeved on the rod part; and the elastic part is sleeved outside the contraction part after passing through the housing 9.

Figure 1:
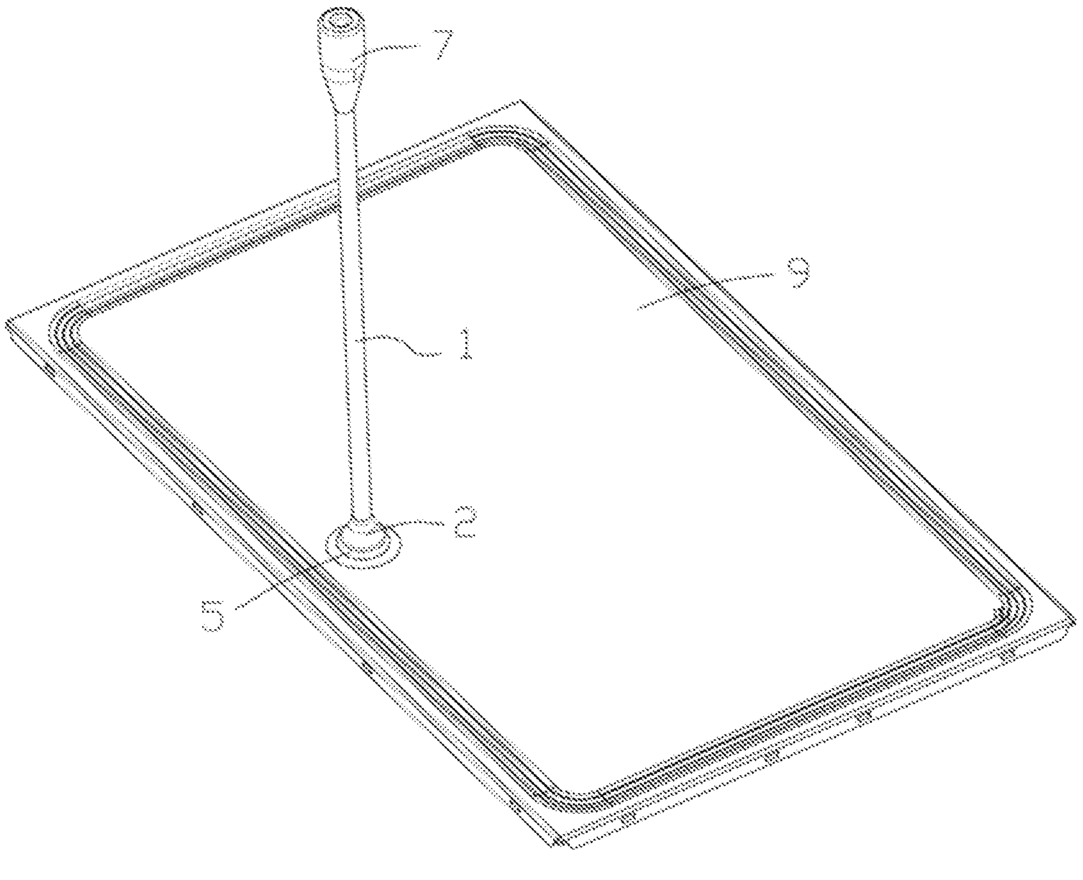
FIG. 1 is the structural schematic diagram of the quick-connection waterproof and dustproof joint of the application matched with the housing.
Figure 2:
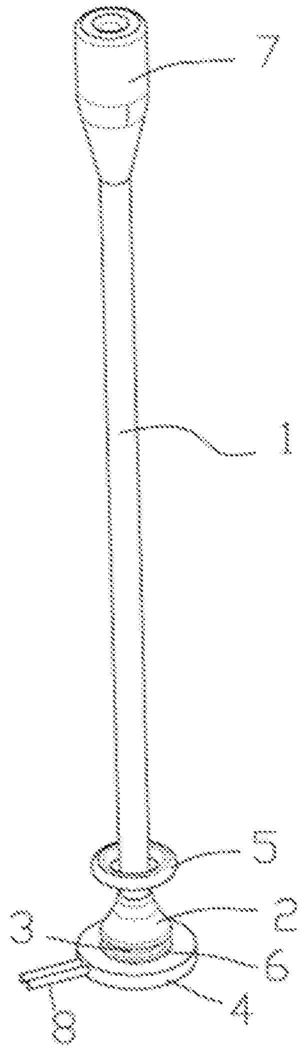
FIG. 2 is a schematic structural diagram of a quick-connection waterproof and dustproof joint of the application.
Figure 4:
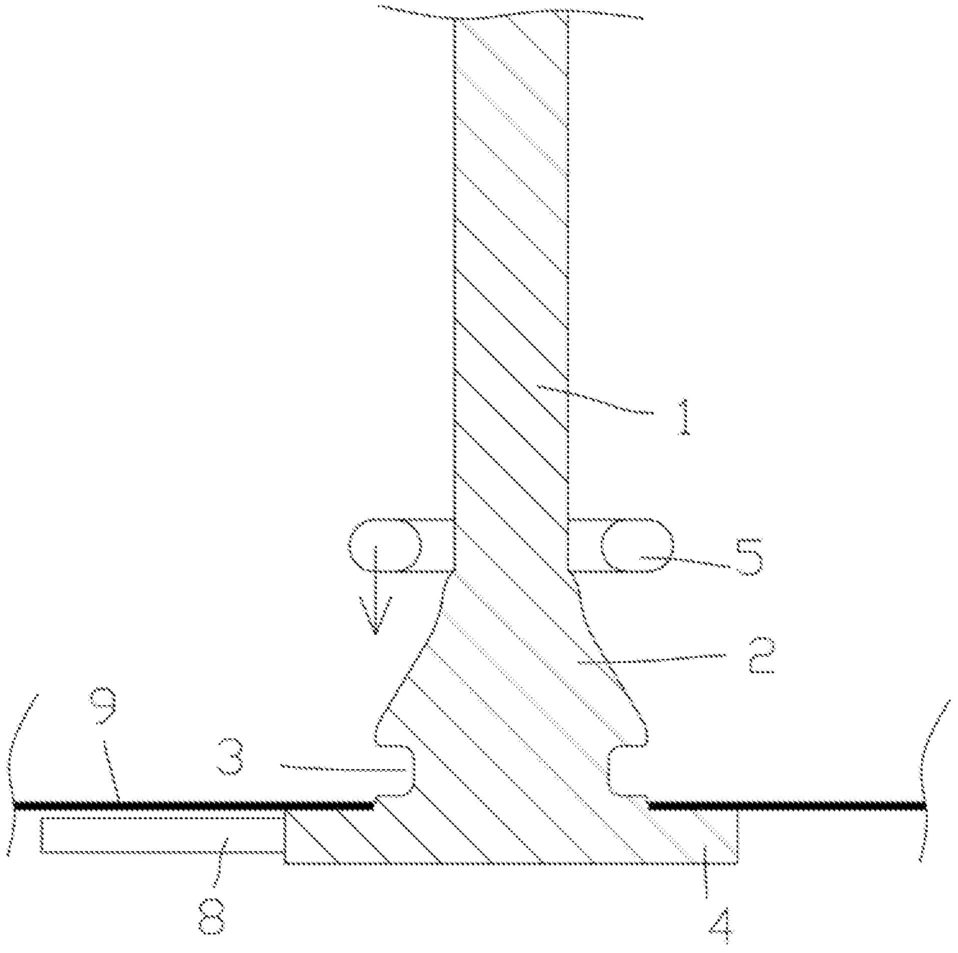
FIG. 4 is a cross-sectional view of the rod part, the gradient part, the constriction part, and the elastic part of the application when they pass through the housing.
Figure 5:
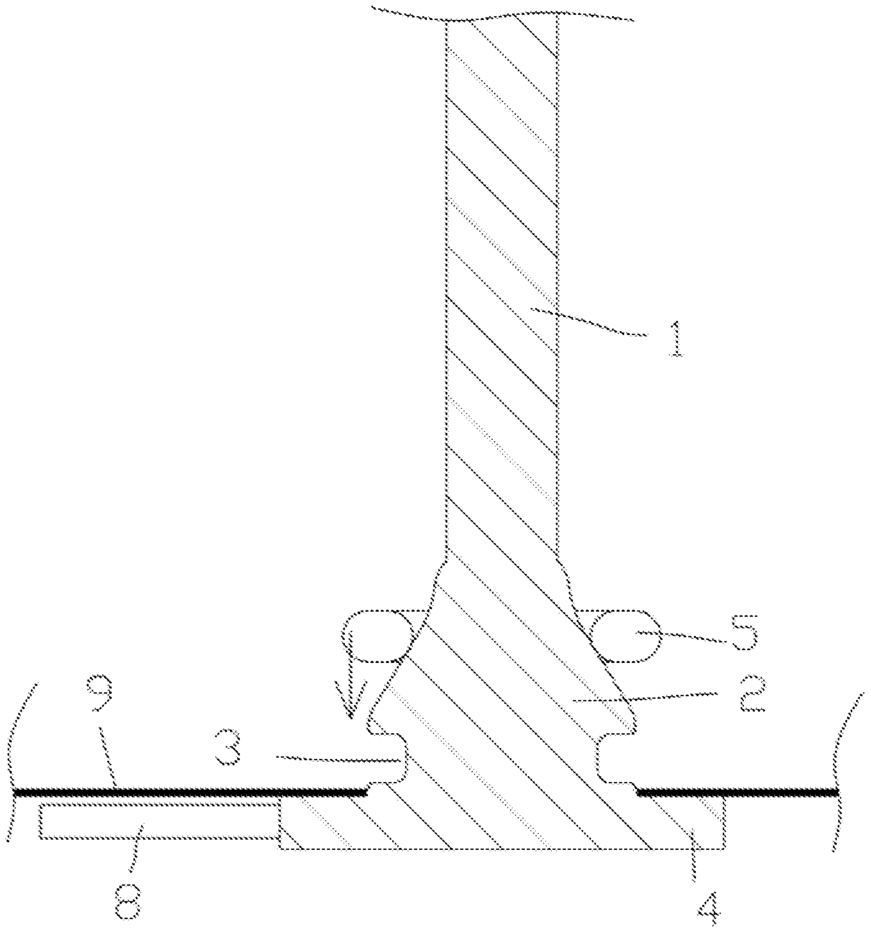
FIG. 5 is a cross-sectional view of the waterproof joint and the housing when the elastic part of the application moves downward.
Figure 6:
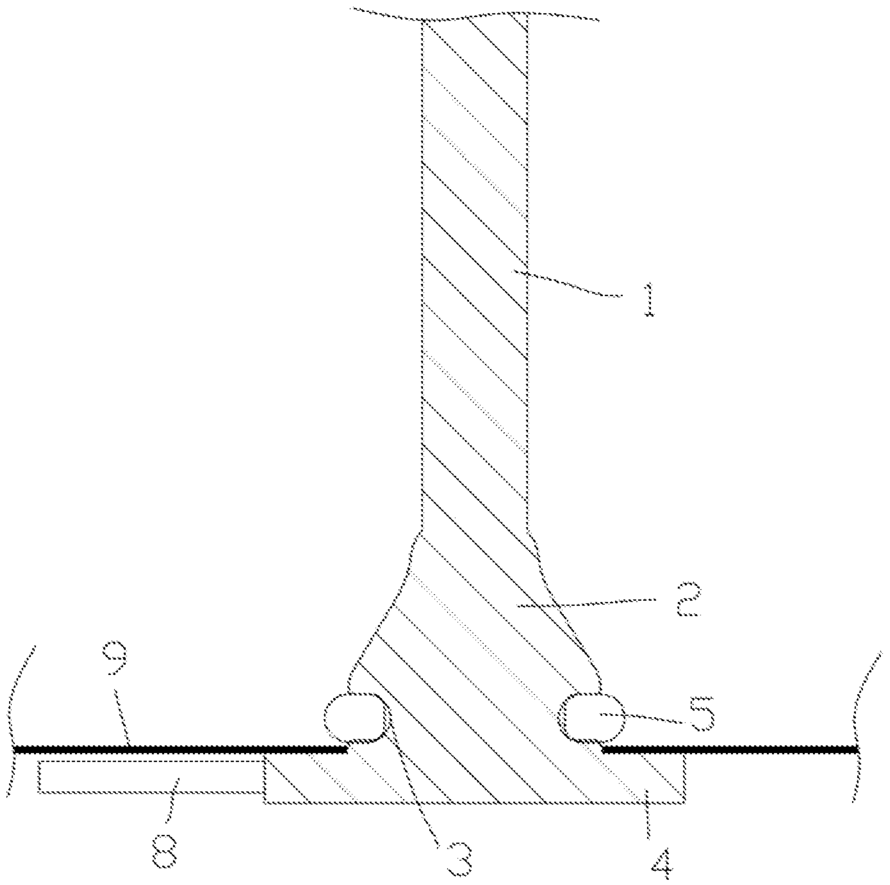
FIG. 6 is a cross-sectional view of the quick-connection waterproof and dustproof joint of the application after being connected to the housing.

Specifically, in the quick-connection waterproof and dustproof joint described in this embodiment, before the quick-connection waterproof and dustproof joint is connected with the housing 9 of the electrical device, the elastic part 5 can be set on the rod part 1 movably up and down. When the quick-connection waterproof and dustproof connector is connected and fixed with the housing 9 of the electrical device, move the rod part 1 from the bottom of the housing 9 of the electrical device, as shown in FIG. 1. The gradient part 2 and the constriction part 3 pass through the through hole 91 of the housing 9 of the electrical device. At this time, the limit part 4 abuts against the bottom of the housing 9, and then pushes the elastic part 5 downward as shown in FIG. 4. After the elastic part 5 passes through the gradient part 2, the elastic deformation radius gradually increases. As shown in FIG. 5, the elastic part 5 continues to move downward. When it reaches the position of the constriction part 3, the elastic part 5 resets, so that the elastic part 5 can be tightly sleeved. As shown in FIG. 6, the quick-connection waterproof and dustproof joint is connected to the housing 9 of the electrical device firmly through the action of the elastic part 5 and the limit part 4, and the elastic part 5, due to the action of tension, The connection between the quick-connection waterproof and dustproof joint and the through hole 91 is sealed, to play a sealing role, to be waterproof and dustproof; According to the embodiment, the rod part 1, the gradient part 2, the contraction part 3 and the limit part 4 are arranged, so that the connection between the quick-connection waterproof and dustproof joint and the housing 9 of the electrical device does not require side slotting, the waterproof and dustproof effect is good, and there is no need to set nuts and bolts, and the installation is fist and convenient; thus, it is convenient for automatic installation.

In the quick-connection waterproof and dustproof joint described in this embodiment, the rod part 1 is cylindrical; the gradient part 2 is a truncated cone; the constriction part 3 is cylindrical;

The top surface of the gradient part 2 is connected to the rod part 1; the bottom surface of the gradient part 2 is connected to the constriction part 3; the radius of the bottom surface of the gradient part 2 is greater than the radius of the top surface of the gradient part 2; The radius of the constriction part 3 is greater than the radius of the rod part 1; the radius of the constriction part 3 is smaller than the radius of the bottom surface of the gradient part 2. In the quick-connection waterproof and dustproof joint described in this embodiment, the radius of the rod part 1 is the same as the radius of the top surface of the gradient part 2.

Specifically, the cone-shaped gradient part 2, the cylindrical rod part 1 and the cylindrical constriction part 3 are convenient for installation and connection with the housing 9 of the electrical device; Wherein, the radius of the rod part 1 is the same as the radius of the top surface of the gradient part 2 so that when the elastic part 5 is pushed downward, the radius of the elastic part 5 can gradually increase with the truncated gradient part 2, which is convenient for the elastic part 5 to move downward. When the bottom reaches the rod part 1, the elastic part 5 contracts due to the effect of reset, and because the radius of the constriction part 3 is greater than the radius of the rod part 1, the elastic part 5 can be tightly sleeved on the outside of the constriction part 3, and At the same time, it can be set on the rod part 1 movably up and down.

In the quick-connection waterproof and dustproof joint described in this embodiment, the limit part 4 is cylindrical; the radius of the limit part 4 is greater than the radius of the bottom surface of the gradient part 2. Through the above arrangement, the limit part 4 can be prevented from passing through the through hole 91, so that the limit part 4 abuts against the bottom surface of the housing 9.

In the quick-connection waterproof and dustproof joint described in this embodiment, the limit part 4 is provided with a limit block 6 at the connection with the constriction part 3; The radius of the limit block 6 is the same as that of the bottom surface of the gradient part 2. In the quick-connection waterproof and dustproof joint described in this embodiment, the thickness of the elastic part 5 is smaller than the height of the constriction part 3.

Specifically, the radius of the limit block 6 is the same as the radius of the bottom surface of the gradient part 2. When the elastic part 5 reaches the position of the constriction part 3, the elastic part 5 contracts due to the reset effect, and the height of the constriction part 3 i.e., the distance between the limit block 6 and the bottom surface of the gradient part 2 is slightly smaller than the thickness of the elastic part 5, therefore, while the elastic part 5 is set outside the contraction part 3 and compressed in the vertical direction, it can extend slightly outward due to tension, thus enhancing the waterproof and dustproof effects between the quick waterproof and dustproof joint and the housing 9 of the electrical part.

In the quick-connection waterproof and dustproof joint described in this embodiment, the end of the rod part 1 away from the gradient part 2 is provided with a connector 7; A hollow passage is provided between the rod part 1, the gradient part 2, the constriction part 3, and the limit part 4; a wire 8 is arranged in the passage; one end of the wire 8 is connected to the connector 7; the other end of the wire 8 protrudes out of the limit part 4. The radius of the connector 7 is smaller than the radius of the through hole 91 so that the connector 7 can pass through the through hole 91.

In the quick-connection waterproof and dustproof joint described in this embodiment, the elastic part 5 is a silicone ring or a rubber ring.

A quick-connection waterproof and dustproof connection structure described in this embodiment includes a housing 9 and a quick-connection waterproof and dustproof joint; the housing 9 is provided with a through hole 91; the quick-connection waterproof and dustproof joint includes a rod part 1; one end of the rod part 1 is provided with a gradient part 2; the end of the gradient part 2 away from the rod part 1 is provided with a constriction part 3; the end of the constriction part 3 away from the gradient part 2 is provided with a limit part 4; The quick-connection waterproof and dustproof joint also includes an elastic part 5 movably sleeved on the rod part 1;

The rod part 1, the gradient part 2, and the constricted part 3 are movably passed through the through hole 91; after the rod part 1, the gradient part 2, and the constricted part 3 pass through the housing 9, The elastic part sleeved on the rod part is sleeved outside the contraction part by the gradient part 2; the elastic part 5 cooperates with the limit part 4 to fix the housing 9 and the quick-connection waterproof and dustproof joint.

Figure 3:
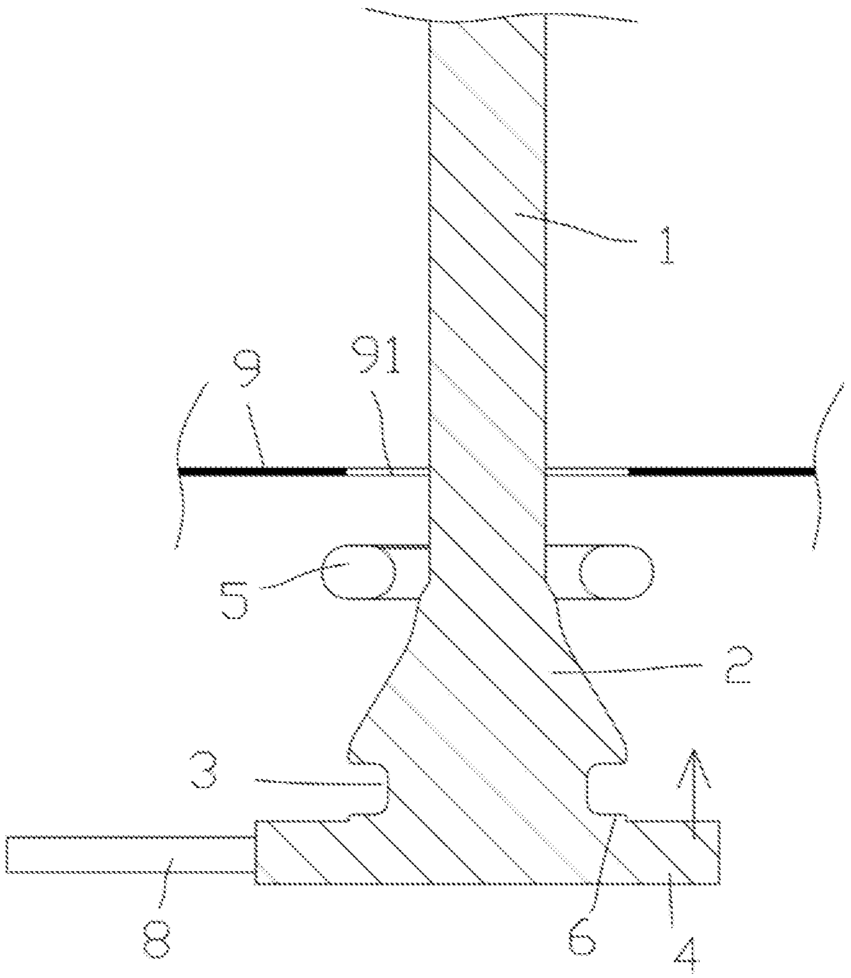
FIG. 3 is a cross-sectional view of the application before the quick-connection waterproof and dustproof joint is connected to the housing.

Before the quick-connection waterproof and dustproof joint is connected with the housing 9 of the electrical device, the elastic part 5 can move up and down on the rod 1, When it is necessary to connect the quick-connection waterproof and dustproof joint with the housing 9 of the electrical device, move the rod part 1 from the bottom of the housing 9 of the electrical device, as shown in FIG. 3, upward along the through hole 91, until the rod part 1, the gradient part 2 and the contraction part 3 pass through the through hole 91 of the housing 9 of the electrical device, when the limit part 4 is against the bottom of the housing 9, then push the elastic part 5 downward as shown in FIG. 4, after the elastic part 5 passes through the gradient part 2, the radius gradually increases due to the elastic deformation, as shown in FIG. 5, the elastic part 5 continues to move downward, and when it reaches the position of the constriction part 3, the elastic part 5 is reset, so that it can be tightly sleeved outside the constriction part 3 as shown in FIG. 6, due to the function of the elastic part 5 and the limit part 4, the quick-connection waterproof and dustproof joint is firmly connected with the housing 9 of the electrical device, moreover, the tension of the elastic part 5 seals the connection between the quick waterproof and dustproof joint and the through hole 91, thus playing a sealing role, so as to be dust-prevent dust and waterproof; In this embodiment, by setting the rod part 1, the gradient part 2, the constriction part 3 and the limit part 4, the waterproof and dustproof joint is quickly connected to the housing 9 of the electrical device. The connection between them does not require side slots, the waterproof and dustproof effect is good, and there is no need to set nuts and bolts, and the installation is fast and convenient; thus facilitating automatic installation.

In the quick-connection waterproof and dustproof connection structure described in this embodiment, the rod part 1 is cylindrical; the gradient part 2 is a truncated cone; the constriction part 3 is cylindrical; the cross-section of the through hole 91 is circular; the limit part 4 is cylindrical;

The top surface of the gradient part 2 is connected to the rod part 1; the bottom surface of the gradient part 2 is connected to the constriction part 3; the radius of the bottom surface of the gradient part 2 is greater than the radius of the top surface of the gradient part 2; The radius of the constriction part 3 is greater than the radius of the rod part 1; the radius of the constriction part 3 is smaller than the radius of the bottom surface of the gradient part 2;

The radius of the rod part 1 is the same as the radius of the top surface of the gradient part 2;

The radius of the limit part 4 is greater than the radius of the bottom surface of the gradient part 2;

The radius of the through hole 91 is greater than the radius of the bottom surface of the gradient part 2; the radius of the through hole 91 is smaller than the radius of the limit part 4.

Finally, it should be noted that the above embodiments are only used to illustrate the technical solutions of the application, but not to limit the protection scope of the application. Although the application has been described in detail concerning the preferred embodiments, those of ordinary skill in the art should understand that the technical solutions of the application may be modified or equivalently replaced without departing from the spirit and scope of the technical solutions of the application.

The invention claimed is:

1. A quick-connection waterproof and dustproof joint, comprising a rod part (1); one end of the rod part (1) is provided with a gradient part (2); the gradient part (2) is away from the rod part (1); an end of the gradient part (2) away from the rod part (1) is provided with a constriction part (3); the end of the constriction part (3) away from the gradient part (2) is provided with a limit part (4); the quick-connection waterproof and the dustproof joint also includes an elastic part (5) that is movably set on the rod part (1); the elastic part (5) is sleeved outside the constriction part (3) after the rod part (1), the gradient part (2) and the constriction part (3) pass through a housing (9);

wherein the rod part (1) is cylindrical; the gradient part (2) is a truncated cone; the contraction part (3) is cylindrical; a top surface of the gradient part (2) is connected with the rod part (1); a bottom surface of the gradient part (2) is connected with the constriction part (3); a radius of the bottom surface of the gradient part (2) is greater than that of the gradient part (2) a radius of the top surface; a radius of the constriction part (3) is greater than a radius of the rod part (1); the radius of the constriction part (3) is smaller than the radius of the bottom surface of the gradient part (2).

2. The quick-connection waterproof and dustproof joint according to claim 1, wherein the radius of the rod part (1) is the same as the radius of the top surface of the gradient part (2).

3. The quick-connection waterproof and dustproof joint according to claim 1, wherein the limit part (4) is cylindrical; a radius of the limit part (4) is greater than the radius of the bottom surface of the gradient part (2).

4. The quick-connection waterproof and dustproof joint according to claim 1, wherein the limit part (4) is provided with a limit block (6) at the connection with the constriction part (3); a radius of the limit block (6) is the same as the radius of the bottom surface of the gradient part (2).

5. The quick-connection waterproof and dustproof joint according to claim 1, wherein the end of the rod part (1) away from the gradient part (2) is provided with a connector (7); the rod part (1), a hollow passage is arranged between the gradient part (2), the constriction part (3) and the limit part (4); a wire (8) is arranged in the hollow passage; one end of the wire (8) is connected to the connector (7); the other end of the wire (8) protrudes out of the limit part (4).

6. The quick-connection waterproof and dustproof joint according to claim 1, wherein the elastic part (5) is a silicone ring or a rubber ring.

7. The quick-connection waterproof and dustproof joint according to claim 1, wherein the thickness of the elastic part (5) is smaller than the height of the constriction part (3).

8. A quick-connection waterproof and dustproof connection structure, comprising a housing (9) and a quick-connection waterproof and dustproof joint; the housing (9) is provided with a through hole (91); the quick-connection is waterproof and dustproof joint comprises a rod part (1); one end of the rod part (1) is provided with a gradient part (2); the end of the gradient part (2) away from the rod part (1) is provided with a constriction part (3); a limit part (4) is provided at one end of the constriction part (3) away from the gradient part (2); the quick-connection waterproof and the dustproof joint further comprises an elastic part (5) movably sleeved on the rod part (1);

the rod part (1), the gradient part (2), and the constriction part (3) are movably penetrated through the through hole (91); after the rod part (1), the gradient part (2) and the constriction part (3) pass through the housing (9), the elastic part (5) sleeved on the rod part (1) is sleeved outside the constriction part (3) after passing through the gradient part (2); the elastic part (5) cooperates with the limit part (4) to fix the housing (9) with the quick-connection waterproof and the dustproof joint;

wherein the rod part (1) is cylindrical; the gradient part (2) is a truncated cone; the constriction part (3) is cylindrical; a cross-sectional shape of the through hole (91) is circular; the limit part (4) is cylindrical; a top surface of the gradient part (2) is connected with the rod part (1); a bottom surface of the gradient part (2) is connected with the constriction part (3); the radius of the bottom surface of the gradient part (2) is greater than the radius of the top surface of the gradient part (2); a radius of the constriction part (3) is greater than a radius of the rod part (1); a radius of the constriction part (3) is smaller than the radius of the bottom surface of the gradient part (2);

a radius of the rod part (1) is the same as the radius of the top surface of the gradient part (2); a radius of the limit part (4) is greater than the radius of the bottom surface of the gradient part (2); a radius of the through hole (91) is greater than the radius of the bottom surface of the gradient part (2); the radius of the through hole (91) is smaller than the radius of the limit part (4).

* * * * *